(12) United States Patent
Wright

(10) Patent No.: US 9,695,489 B1
(45) Date of Patent: *Jul. 4, 2017

(54) GUN BARREL MANUFACTURING METHODS

(71) Applicant: David W. Wright, Gilbert, AZ (US)

(72) Inventor: David W. Wright, Gilbert, AZ (US)

(73) Assignee: Gunwright Intellectual Property LLC, Gilbert, AZ (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/182,578

(22) Filed: Jun. 14, 2016

Related U.S. Application Data

(63) Continuation-in-part of application No. 14/942,694, filed on Nov. 16, 2015, now Pat. No. 9,365,930, which is a continuation-in-part of application No. 14/155,093, filed on Jan. 14, 2014, now Pat. No. 9,186,712.

(60) Provisional application No. 61/752,375, filed on Jan. 14, 2013.

(51) Int. Cl.
| | |
|---|---|
| *C23C 24/04* | (2006.01) |
| *F41A 21/22* | (2006.01) |
| *C21D 9/08* | (2006.01) |
| *C23C 30/00* | (2006.01) |
| *B23K 31/02* | (2006.01) |
| *C22F 1/00* | (2006.01) |
| *F41A 21/02* | (2006.01) |

(52) U.S. Cl.
CPC ........... *C21D 9/08* (2013.01); *B23K 31/02* (2013.01); *C22F 1/00* (2013.01); *C23C 24/04* (2013.01); *C23C 30/005* (2013.01); *F41A 21/02* (2013.01); *F41A 21/22* (2013.01)

(58) Field of Classification Search
CPC ........................................................ C21D 7/12
USPC ........................................................ 42/76.1
See application file for complete search history.

(56) References Cited

U.S. PATENT DOCUMENTS

| | | | |
|---|---|---|---|
| 4,577,431 | A | 3/1986 | Siemers et al. |
| 4,669,212 | A | 6/1987 | Jackson et al. |
| 5,554,415 | A | 9/1996 | Turchan et al. |
| 5,915,937 | A | 6/1999 | Chistensen |
| 5,935,351 | A | 8/1999 | Sherman et al. |
| 6,779,716 | B1 | 8/2004 | Grow |

(Continued)

OTHER PUBLICATIONS

New Powder Technologies for Molybdenum Alloy Gun Barrel Liners; Army Armament Research and Development Center Watervliet NY Large Caliber Weapon Systems Lab, Jun. 30, 1985.

(Continued)

*Primary Examiner* — Reginald Tillman, Jr.
(74) *Attorney, Agent, or Firm* — Booth Udall Fuller, PLC

(57) ABSTRACT

A method of forming a gun barrel is disclosed that includes applying one or more coatings to the gun barrel such as just a top coating, or a bond coating and then a top coating. The method may also include (before applying one or more coatings): threading an outer surface of the gun barrel proximate a first end of the gun barrel; threadedly coupling the first end of the gun barrel to a gun chamber; fixedly coupling the gun barrel to the gun chamber. The method may also include heat treating the coating layer(s), contouring the outer coating layer, applying a ceramic top coating to the contoured outer coating layer of the gun barrel, and/or sealing the gun barrel with a liquid metal sealer.

16 Claims, 5 Drawing Sheets

(56) References Cited

U.S. PATENT DOCUMENTS

| | | | |
|---|---|---|---|
| 6,896,970 B2 | 5/2005 | Mayzel | |
| 7,191,558 B1 | 3/2007 | Conroy et al. | |
| 7,721,478 B2 | 5/2010 | Withers et al. | |
| 8,034,153 B2 | 10/2011 | Marchiando et al. | |
| 8,052,590 B2 | 11/2011 | Edmunds et al. | |
| 8,247,050 B2 | 8/2012 | McCrea et al. | |
| 9,365,930 B1 * | 6/2016 | Wright | C23C 24/04 |
| 2004/0140292 A1 | 7/2004 | Kelley et al. | |
| 2006/0265926 A1 * | 11/2006 | Sietsema | F41A 21/04 42/76.02 |
| 2008/0120889 A1 | 5/2008 | Bose et al. | |
| 2010/0028550 A1 | 2/2010 | Farmer et al. | |
| 2011/0287223 A1 | 11/2011 | Victor et al. | |

OTHER PUBLICATIONS

Effect of Heat-Treatment of Spray-Dried Powder on Properties of Ultrafine-Structured WC-Co Coating; College of Materials Science and Engineering, Beijing University of Technology Beijing 100124 China; Wang et al., 2012.

* cited by examiner

GUN BARREL MANUFACTURING METHODS

CROSS REFERENCE TO RELATED APPLICATIONS

This application is a continuation-in-part application of U.S. patent application Ser. No. 14/942,694, entitled "Gun Barrel Manufacturing Methods" to Wright, which was filed on Nov. 16, 2015, now U.S. Pat. No. 9,365,930, which is a continuation-in-part application of U.S. patent application Ser. No. 14/155,093, entitled "Gun Barrel Manufacturing Methods" to Wright, which was filed on Jan. 14, 2014, now U.S. Pat. No. 9,186,712, which application claims the benefit of the filing date of U.S. Provisional Patent Application 61/752,375, entitled "Gun Barrel Manufacturing Methods" to Wright, which was filed on Jan. 14, 2013, the contents of all of which are all hereby incorporated by reference.

BACKGROUND

1. Technical Field

Aspects of this document relate generally to methods of manufacturing gun barrels.

2. Background Art

Regular use of guns often leads to the degradation of the aesthetic and performance affecting characteristics of gun barrels.

SUMMARY

According to one aspect, a method of manufacturing a gun barrel includes applying a bond coating comprising an alloy or superalloy to a gun barrel; and cold gas-dynamic spraying the gun barrel with a top coating comprising at least one of titanium powder, titanium alloy powder, aluminum powder, aluminum alloy powder, titanium-aluminum matrix powder, chromium powder, chromium alloy powder, cobalt powder, cobalt alloy powder, copper powder, copper alloy powder, iron powder, iron alloy powder, nickel powder, nickel alloy powder, and any combination thereof.

Various implementations may include one or more of the following.

Applying the bond coating may include applying a bond coating comprising a nickel based alloy or superalloy to the gun barrel. Applying the bond coating may include spraying the gun barrel with a bond coating comprising a nickel based alloy or superalloy. Spraying the gun barrel may include thermal spraying the gun barrel with a bond coating comprising a nickel based alloy or superalloy until the bond coating is between approximately 0.005 inches and 0.010 inches thick. Cold gas-dynamic spraying the gun barrel may include cold gas-dynamic spraying the gun barrel with the top coating until the bond and top coatings together are between approximately 0.300 inches and 0.500 inches thick.

The method may further include: threading an outer surface of the gun barrel proximate a first end of the gun barrel; threadedly coupling the first end of the gun barrel to a gun chamber; and fixedly coupling the gun barrel to the gun chamber before applying the bond coating. The method may further include threading an inner surface of the gun chamber complementary to the threaded outer surface of the gun barrel.

Fixedly coupling the gun barrel to the gun chamber may include at least one of tack welding, soldering, or brazing the gun barrel and the gun chamber.

Applying a bond coating may include thermal spraying the gun barrel with a bond coating comprising a nickel based alloy or superalloy until the bond coating is between approximately 0.005 inches and 0.010 inches thick.

Cold gas-dynamic spraying the gun barrel may include cold gas-dynamic spraying the gun barrel with the top coating until the bond and top coatings together are between approximately 0.300 inches and 0.500 inches thick.

The method may further include heat treating the bond and top coatings and then one or more or all of the following: contouring the top coating; spraying the top coating with a ceramic coating; and sealing the gun barrel with a liquid metal sealer.

The method may further include one or more of the following: contouring the top coating; spraying the top coating with a ceramic coating; and sealing the gun barrel with a liquid metal sealer.

According to another aspect, a method of manufacturing a gun barrel includes cold gas-dynamic spraying a gun barrel with a top coating comprising at least one of titanium powder, titanium alloy powder, aluminum powder, aluminum alloy powder, titanium-aluminum matrix powder, chromium powder, chromium alloy powder, cobalt powder, cobalt alloy powder, copper powder, copper alloy powder, iron powder, iron alloy powder, nickel powder, nickel alloy powder, and any combination thereof.

Various implementations may include one or more of the following.

The method may further include threading an outer surface of the gun barrel proximate a first end of the gun barrel; threadedly coupling the first end of the gun barrel to a gun chamber; and fixedly coupling the gun barrel to the gun chamber before applying the top coating. The method may further include threading an inner surface of the gun chamber complementary to the threaded outer surface of the gun barrel. Fixedly coupling the gun barrel to the gun chamber may include at least one of tack welding, soldering, or brazing the gun barrel and the gun chamber.

Cold gas-dynamic spraying the gun barrel may include cold gas-dynamic spraying the gun barrel with the top coating until the top coating is between approximately 0.300 inches and 0.500 inches thick.

The method may further include one or more or all of the following: heat treating the top coating; contouring the top coating; spraying the top coating with a ceramic coating; and sealing the gun barrel with a liquid metal sealer.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

Figure 1:
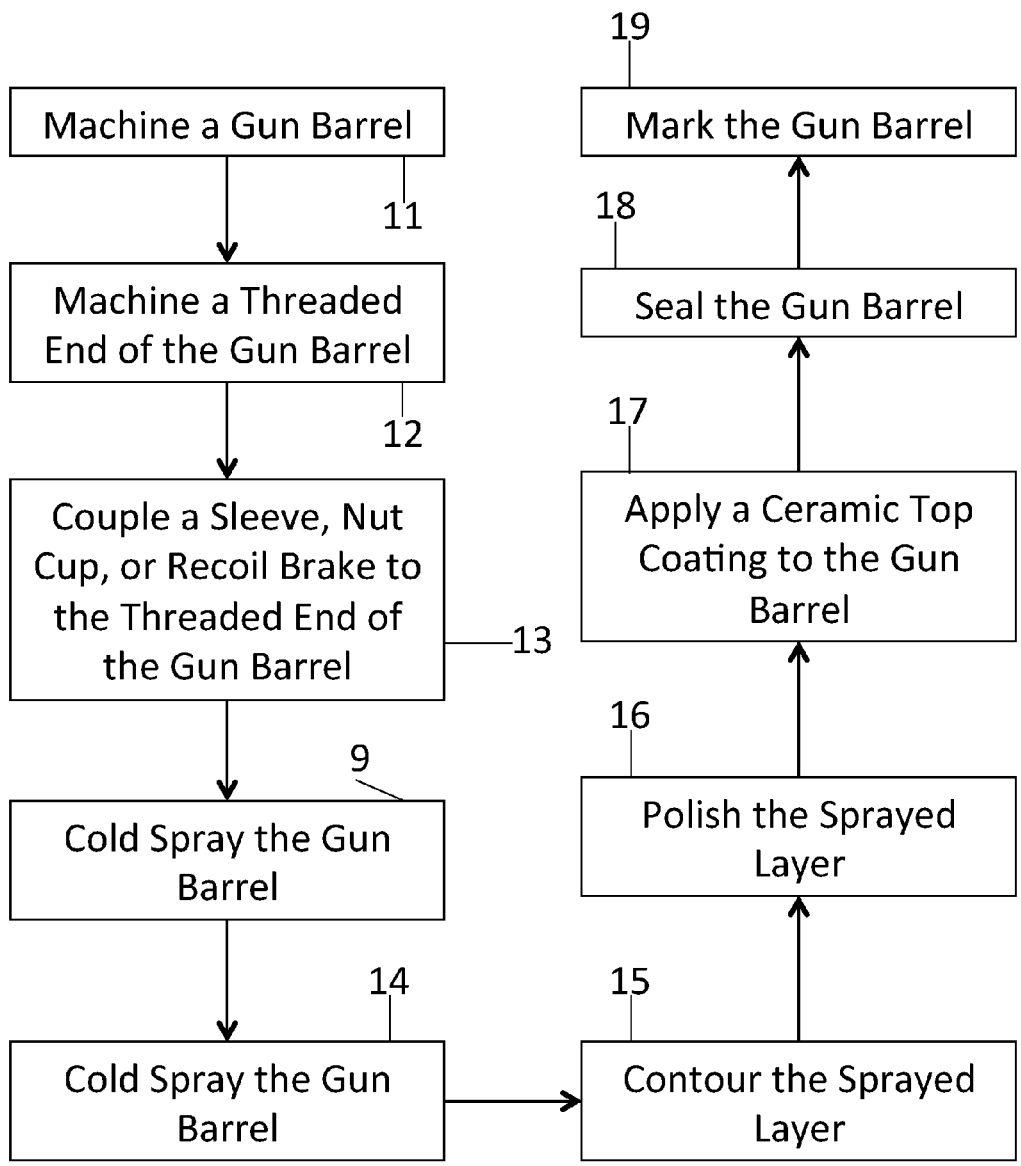
FIG. 1 is a flowchart of a first implementation of a method of manufacturing a gun barrel.

This disclosure, its aspects and implementations, are not limited to the specific components or assembly procedures disclosed herein. Many additional components and assembly procedures known in the art consistent with the intended gun barrel and/or manufacture procedures for a gun barrel will become apparent for use with implementations of gun barrels and methods of manufacture from this disclosure. Accordingly, for example, although particular gun barrels are disclosed, such gun barrels and implementing components may comprise any shape, size, style, type, model, version, measurement, concentration, material, quantity, and/or the like as is known in the art for such gun barrels and implementing components, consistent with the intended operation of gun barrels.

New gun barrels and methods of gun barrel manufacturing are disclosed in this document. One or more implementations utilize powder metallurgy and material (metal/ceramic) spray and other application techniques. Process implementations described herein improve firearm performance and accuracy. The gun barrels manufactures according to one or more implementations of this disclosure add lightweight strength, reduce vibration, and control heat for a more accurate shooting gun barrel. The various gun barrels may be created using procedures as added to and improved upon through the procedures described here.

The following terminology will be used in accordance with the definitions and explanations set out below. Notwithstanding, other terminology, definitions, and explanations may be found throughout this document, as well.

As used in this document, "barrel" is a term used in its broadest sense and may refer to any core member (e.g., a tube) through which a projectile (e.g., bullet) will be ultimately fired. Barrels may be comprised of any materials, shapes, sizes, styles, types, models, versions, classes, grades, measurements, weights, and the like. Barrels may be in any process state or form as well, such as barrel liners, barrel blanks, machined barrels, reduced diameter barrels, barrels built up on mandrels, new barrels, used barrels, and the like. It is also noted that not all barrel manufacturers have/use the same contours/profiles and the like of barrels, such that there can be any different number of ways of classifying/categorizing them. Accordingly, contours may be classified by characteristics, such as Thin, Medium, Heavy, Straight, and the like for example. Contours may be classified by numbers, such as Contour 1, Contour 2, Contour 3, and the like for example. Contours may be classified by names, such as Featherweight, Lightweight, Lightweight Sporter, Sporter, Magnum Sporter, Heavy Sporter, Lightweight Varmint, Varmint, Heavy Varmint, Bull, Heavy Bull, Rimfire, Rimfire Target, Benchrest, Straight, Super Size, Light Palma, Palma, Heavy Palma, Remington, and the like for example. Contours may not have a classification and may be completely custom for example. Contours may be classified by any combination of characteristics, numbers, names, and the like, such as 3 Sporter, 4 Magnum Sporter, 4.1 Magnum Sporter, 5 Lt Varmint Sporter, 5.5 Med Varmint Sporter, 5.75 Hvy Varmint Sporter, 6 Light Target, 7.1 Light Varmint, 7.2 Light Varmint, 7.4 Light Varmint, 7.5 Light Varmint, 7.6 Light Varmint, 7.7 Heavy Varmint, 7.8 Max Heavy Varmint, 7.9 1000 Yard, 8 Heavy Bull, 9 Rimfire Target, 10 Hunter, 12 Palma Std, 12.2 Palma Light, 12.4 Palma Heavy, Special Large, and the like for example. Additionally, barrel contours/profiles for different types of firearm platforms can have different names and/or other forms of classification/categorization. For example, there can be Bolt Action Contours (e.g., Match/Varmint Contours, Sporter Contours, Palma Contours, Straight Contours, and the like), M1 Garand, M1A/M14, M1903 Contours (e.g., GI Pattern, Heavy Pattern, Med. Bush Pattern, Med. Weight Pattern, Heavy Pattern, M1903, M1903-A3, and the like), AR-15 Contours (e.g., Lightweight/Pencil, M4/Government, Heavy, Carbine Pre Ban, Mid Weight, H-Bar, Varmatch, and the like), AR-10 Contours (e.g., AR10/DPMS, M110, and the like), and the like.

In the following description, it is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

In one or more implementations, an improved or enhanced gun barrel may be manufactured from a previously existing gun barrel. The previously existing gun barrel may be a new or used gun barrel. FIG. 1 depicts a non-limiting flowchart of one implementation of manufacturing a gun barrel from a previously existing gun barrel. It is to be understood that various implementations may not include each of the steps shown in the flowchart of FIG. 1 and the order of the steps shown in FIG. 1 is not limiting. That is, in other implementations, the steps may be performed in an order different than that shown in FIG. 1 or any or all of steps 11, 12, and 13 for example may not be included without departing from the scope of this disclosure.

In one or more implementations, a method for manufacturing a gun barrel comprises machining a gun barrel (step 11). Again, this step is optional as one could start directly with step 12 or step 13 depending on the starting barrel for example.

Machining the gun barrel may comprise any methods or mechanisms for machining a gun barrel previously known in the art. According to some aspects, machining the gun barrel comprises machining an existing gun barrel to a desired wall the thickness. The desired wall thickness may vary according to the caliber or type of gun for which the gun barrel will be used. According to another aspect, the wall thickness may remain relatively constant, but the actual diameter of the gun barrel will vary dependent upon the caliber of the gun. The wall thickness after machining is within acceptable safe pressure limits specific to the gun for which barrel will be used.

In one or more implementations, a method for manufacturing a gun barrel further comprises machining a threaded or muzzle end of the gun barrel (step 12). Again, this step is optional as one could start directly with step 9. Machining a threaded end of the gun barrel, according to some aspects, prepares or allows for coupling of at least one of a sleeve, a knurled nut cap, or a recoil brake to the threaded end of the gun barrel (step 13). The sleeve, knurled nut cap, or recoil brake may individually or in combination with one another provide a dam or barrier to the spray that is applied to the gun at a later time. A tool or tape may be coupled to the other end of the gun barrel while the coatings are sprayed on the gun barrel.

One or more implementations of a method of manufacturing a gun barrel further comprise spraying the gun barrel with a first or bonding coating (step 9). According to some aspects, spraying the gun barrel with a bonding coating comprises spraying the gun barrel with a second hard, dense coating to form a bonding layer. The bonding coating is typically sprayed on the gun barrel with a thermal spraying technique, such as but not limited to plasma spraying, HVOF, wire arc spraying, flame spraying, cold spraying, or any other technique for applying or depositing metal and/or ceramic coatings to the gun barrel.

The bonding coating forms a metallurgical bond to the gun barrel. The hard, dense coating of the bonding coating may comprise any compounds commonly known in the art. The bonding coating may comprise a material that work hardens. The bonding coating forms an integral strong base material that sustains pressures and fatigue values commonly associated with the combustion of powder and gasses from firing a live round and propelling the projectile (e.g. bullet) down the gun barrel to exit as a shot.

Some examples of materials are alloys and superalloys. An alloy is a mixture of metals or a mixture of a metal and another element. An alloy may be a solid solution of metal elements (a single phase) or a mixture of metallic phases (two or more solutions). Virtually any alloy may be employed. For the exemplary purposes of this disclosure, some alloys that are suitable for manufacturing methods disclosed here may be Alloys of aluminum, Alloys of chromium, Alloys of cobalt, Alloys of copper, Alloys of iron, Alloys of nickel, Alloys of titanium, and the like. Some alloys are nickel based, nickel-chromium based, cobalt based, zinc based, and the like. For example, a range copper-zinc alloys may be employed with differing combinations of properties, including strength, machinability, wear-resistance, hardness, color, thermal conductivity, and corrosion-resistance. A superalloy, or high-performance alloy, is an alloy that exhibits several key characteristics: excellent mechanical strength, resistance to thermal creep deformation, good surface stability and resistance to corrosion or oxidation (oxidation or corrosion resistance may be provided by elements such as aluminum and chromium for example). Some superalloys are nickel based, nickel-chromium based, cobalt based, and the like. Examples of superalloys are Hastelloy, Inconel (a family of austenite nickel-chromium-based superalloys), Waspaloy, Rene alloys, Haynes alloys, Incoloy, MP98T, TMS alloys, CMSX single crystal alloys, and the like.

Other materials may be metallic/ceramic materials, hafnium diboride, and the like. Even other materials may be any equivalents or combinations of any of the foregoing materials.

According to one aspect, the bonding coating is between approximately 0.005 inches and 0.010 inches thick after sprayed application to the gun barrel.

In one or more implementations, a method of manufacturing a gun barrel further comprises cold spraying gun barrel (step 14). More particularly, cold spraying the gun barrel may comprise cold gas-dynamic spraying the gun barrel with metal powder to form an outer layer. In one or more implementations, the metal powder comprises titanium powder, titanium alloy powder, aluminum powder, aluminum alloy powder, titanium-aluminum matrix powder, chromium powder, chromium alloy powder, cobalt powder, cobalt alloy powder, a copper powder, a copper alloy powder, iron powder, iron alloy powder, nickel powder, nickel alloy powder, and any combination thereof. Generally, the metal powder cold sprayed onto the gun barrel will be thick enough for a final machining of the gun barrel to a specified gun barrel contour. According to an aspect, the thickness of the gun barrel and the outer layer after spraying the gun barrel with the metal powder is between approximately 0.250 inches and 0.500 inches thick. More particularly, the thickness of the gun barrel and the outer layer after spraying the gun barrel with the metal powder is between approximately 0.300 inches and 0.500 inches thick.

Cold gas-dynamic spraying is highly advantageous to other methods of applying metals to a gun barrel. For example, cold gas-dynamic spraying a gun barrel with one or more of the listed metal powders fills and gives metallic strength to the gun barrel, resulting in a light-weight and relatively strong metal filler. Moreover, cold gas-dynamic spraying of the metal powder allows the metal powder to have metallurgical bond to the surface of the gun barrel as a solid state material with no heat affected zone, phase change, or oxide contamination. The added value of this material adds light-weight strength, reduces vibration, and controls heat for a more accurate shooting gun barrel.

One or more implementations of a method for manufacturing a gun barrel comprise contouring the outer layer sprayed on the gun barrel (step 15). Contouring the outer layer may comprise machining, grinding, or any other method of contouring otherwise known in the art. In one or more implementations, the outer layer sprayed on the gun barrel is contoured to a specified barrel contour. According to some aspects, a method for manufacturing a gun barrel comprises polishing the gun barrel (step 16). Polishing the gun barrel is typically performed after the gun barrel is contoured. Sand paper comprising between approximately 100 and 800 grit may be utilized to polish the gun barrel.

One or more implementations of a method for manufacturing a gun barrel comprise applying a ceramic top coating to the gun barrel (step 17). According to some aspects, the ceramic top coating is applied to the gun barrel after the metal powder has been sprayed on the gun barrel and before the gun barrel is sealed with a seal coating. More particularly, the ceramic top coating may be applied to the gun barrel after the gun barrel is contoured and before the gun barrel is sealed with a seal coating. The ceramic top coating typically adds aesthetic and mechanical properties, such as vibration and heat control, to the gun barrel.

The ceramic top coating may be applied to a desired thickness. In one or more implementations, the ceramic top coating is applied to a thickness of between approximately 0.015 inches and 0.030 inches. Application of the ceramic top coating may be through any application method or mechanism known in the art. In one, non-limiting implementation, the ceramic top coating is applied by plasma flame spraying the ceramic top coating on the gun barrel.

One or more implementations of manufacturing a gun barrel further comprise sealing the gun barrel (step 18). According to some aspects, sealing the gun barrel comprises seal coating the exterior of the gun barrel with a liquid metal sealer. The liquid metal sealer may be of a phenolic base, such as those liquid metal sealers supplied by Metco (Metcoseal AP or BP) or Dictol Sealer. In other implementations, any liquid metal sealer known in the art may be utilized.

One or more implementations of manufacturing a gun barrel further comprise marking the gun barrel (step 19). Marking the gun barrel typically comprises marking the gun barrel with identifying marks that allow a user to identify at least one of the model and caliber of the inside barrel. Marking may further comprise marking the gun barrel with a brand identifying mark, such as Gunwright™. Marking may be done with a chemical, mechanical, laser, or any other marking mechanism known in the art.

Figure 2:
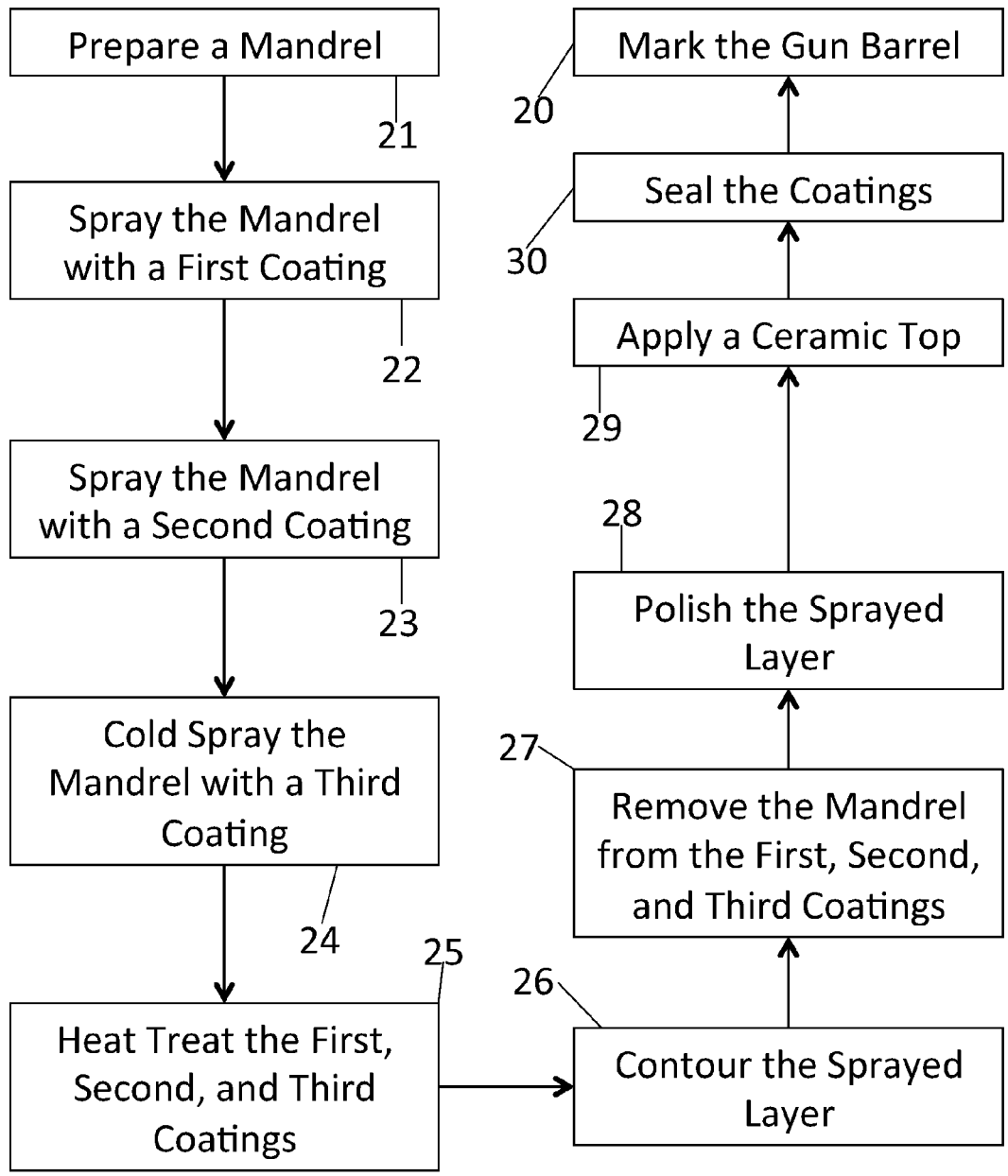
FIG. 2 is a flowchart of a second implementation of a method of manufacturing a gun barrel.

Also contemplated as part of this disclosure is a method of manufacturing or fabricating a new gun barrel. A new gun barrel may be manufactured or completely fabricated from powder metallurgy and metal spray techniques. In general, one or more methods of manufacturing a new gun barrel uses a material coating process that applies coatings upon a mandrel or other sacrificial base that copies the caliber diameter with rifling and shell sporting arms and ammunition manufacturers' institute (SAAMI) dimensions in reverse. FIG. 2 depicts a non-limiting flowchart of one implementation of manufacturing or fabricating a new gun barrel. It is to be understood that various implementations may not include each of the steps shown in the flowchart of FIG. 2 and the order of the steps shown in FIG. 2 is not limiting. For example, in other implementations, the steps may be performed in an order different than that shown in FIG. 2 without departing from the scope of this disclosure.

One or more implementations of manufacturing a gun barrel comprise preparing a mandrel (step 21). Preparing a mandrel typically comprises providing a mandrel or modifying a mandrel such that mandrel is sized substantially equal to the bore of a specified gun barrel. The mandrel may comprise a sacrificial rod and shell representing the reverse of the inside of a barrel. According to some aspects, the mandrel is constructed by one or more of machining, grinding, or electrical discharge machining (EDM) until the mandrel is sized substantially equal to the bore and includes, in some implementations, the desired rifling.

One or more implementations of a method of manufacturing a gun barrel comprise spraying the mandrel with a first coating (step 22). According to some aspects, spraying the mandrel with a first coating comprises spraying the mandrel with a hard, dense coating that includes at least one of tungsten carbide, chrome carbide, or ceramic. According to other aspects, the hard, dense coating of the first coating may comprise any compounds commonly known in the art. The first coating is typically sprayed on the mandrel with a thermal spraying technique, such as but not limited to plasma spraying, high velocity oxygen fuel (HVOF), flame spraying, cold spraying, or any other technique for applying or depositing metal and/or ceramic coatings to the mandrel to form an integral hard surface. More particularly, rifling and/or SAAMI shell dimensions may be imprinted on the interior of the first coating after application of the first coating to the mandrel. According to one aspect, the first coating is approximately 0.010 inches thick after sprayed application to the mandrel.

One or more implementations of a method of manufacturing a gun barrel further comprise spraying the mandrel with a second coating (step 23). According to some aspects, spraying the mandrel with a second coating comprises spraying the mandrel with a second hard, dense coating after application of the first coating. In other implementations, the second coating may be sprayed directly on the mandrel. The second coating is typically sprayed on the mandrel with a thermal spraying technique, such as but not limited to plasma spraying, HVOF, flame spraying, cold spraying, or any other technique for applying or depositing metal and/or ceramic coatings to the mandrel.

The second bonding coating forms a metallurgical bond to the first coating. The hard, dense coating of the bonding coating may comprise any compounds commonly known in the art. The bonding coating may comprise a material that work hardens. The bonding coating forms an integral strong base material that sustains pressures and fatigue values commonly associated with the combustion of powder and gasses from firing a live round and propelling the projectile (e.g. bullet) down the gun barrel to exit as a shot.

Some examples of materials are alloys and superalloys. An alloy is a mixture of metals or a mixture of a metal and another element. An alloy may be a solid solution of metal elements (a single phase) or a mixture of metallic phases (two or more solutions). Virtually any alloy may be employed. For the exemplary purposes of this disclosure, some alloys that are suitable for manufacturing methods disclosed here may be Alloys of aluminum, Alloys of chromium, Alloys of cobalt, Alloys of copper, Alloys of iron, Alloys of nickel, Alloys of titanium, and the like. Some alloys are nickel based, nickel-chromium based, cobalt based, zinc based, and the like. For example, a range copper-zinc alloys may be employed with differing combinations of properties, including strength, machinability, wear-resistance, hardness, color, thermal conductivity, and corrosion-resistance. A superalloy, or high-performance alloy, is an alloy that exhibits several key characteristics: excellent mechanical strength, resistance to thermal creep deformation, good surface stability and resistance to corrosion or oxidation (oxidation or corrosion resistance may be provided by elements such as aluminum and chromium for example). Some superalloys are nickel based, nickel-chromium based, cobalt based, and the like. Examples of superalloys are Hastelloy, Inconel (a family of austenite nickel-chromium-based superalloys), Waspaloy, Rene alloys, Haynes alloys, Incoloy, MP98T, TMS alloys, CMSX single crystal alloys, and the like.

Other materials may be metallic/ceramic materials, hafnium diboride, and the like. Even other materials may be any equivalents or combinations of any of the foregoing materials.

According to one aspect, the second coating is between approximately 0.050 inches and 0.100 inches thick after sprayed application to the mandrel.

In one or more implementations, a method of manufacturing a gun barrel further comprises cold spraying the mandrel with a third coating (step 24). More particularly, cold spraying the mandrel may comprise cold gas-dynamic spraying the mandrel after application of one or both of the first and second coatings with a third coating comprising a metal powder to form a metal layer. In one or more implementations, the metal powder comprises titanium powder, titanium alloy powder, aluminum powder, aluminum alloy powder, titanium-aluminum matrix powder, chromium powder, chromium alloy powder, cobalt powder, cobalt alloy powder, copper powder, copper alloy powder, copper powder, copper alloy powder, iron powder, iron alloy powder, nickel powder, nickel alloy powder, and any combination thereof. Generally, the metal powder cold sprayed onto the mandrel will be thick enough for a final machining of the fabricated gun barrel to a specified gun barrel contour. According to an aspect, the thickness of the first, second, and third coatings after spraying the mandrel with the metal powder is between approximately 0.250 inches and 0.500 inches thick. More particularly, the thickness of the first, second, and third coatings after spraying the mandrel with the metal powder is between approximately 0.300 inches and 0.500 inches thick.

Similar to previous implementations, cold gas-dynamic spraying is highly advantageous to other methods of applying metals to a fabricated gun barrel. For example, cold gas-dynamic spraying a mandrel with one or more of the listed metal powders fills and gives metallic strength to the fabricated gun barrel, resulting in a light-weight and relatively strong metal filler. Moreover, cold gas-dynamic spraying of the metal powder allows the metal powder to have metallurgical bond to the surface of the second coating as a solid state material with no heat affected zone, phase change, or oxide contamination. The added value of this material adds light-weight strength, reduces vibration, and controls heat for a more accurate shooting gun barrel.

One or more implementations of manufacturing a gun barrel further comprise heat treating at least one of the first, second, and third coatings (step 25). Heat treating at least one of the first, second, and third coatings typically comprises heat treating or annealing the respective coating(s) at applicable temperatures to normalize the material as applied. Heat treatment temperature ranges may be between approximately −300° C. and 1500° C. According to various aspects, heat treating of the one or more coatings may be performed after machining of the coatings or, alternatively, after an initial machining and before a final machining of the coatings.

One or more implementations of manufacturing a gun barrel further comprise contouring the sprayed layer of the sprayed coatings (step 26). Contouring the sprayed layer may comprise machining, grinding, or any other method of contouring otherwise known in the art. The sprayed layer typically comprises the third coating. In one or more implementations, the sprayed layer sprayed on the fabricated gun barrel is contoured to a specified barrel contour.

One or more implementations of manufacturing a gun barrel further comprise removing the mandrel from the first, second, and third coatings (step 27). Removing the mandrel from the sprayed first, second, and/or third coatings is typically done via mechanical, chemical, or any other removal technique or mechanism known in the art.

According to some aspects, a method for manufacturing a gun barrel comprises polishing the sprayed layer of the fabricated gun barrel (step 28). Polishing the sprayed is typically performed after the sprayed layer is contoured. Sand paper comprising between approximately 100 and 800 grit may be utilized to polish the gun barrel.

One or more implementations of a method for manufacturing a gun barrel comprise applying a ceramic top coating to the third coating of the fabricate gun barrel (step 29). According to some aspects, the ceramic top coating is applied to the third coating of the fabricated gun barrel after the metal powder has been sprayed on the gun barrel and before the gun barrel is sealed with a seal coating. More particularly, the ceramic top coating may be applied to the gun barrel after the gun barrel is contoured and before the gun barrel is sealed with a seal coating. The ceramic top coating typically adds aesthetic and mechanical properties, such as vibration and heat control, to the gun barrel.

The ceramic top coating may be applied to a desired thickness. In one or more implementations, the ceramic top coating is applied to a thickness of between approximately 0.015 inches and 0.030 inches. Application of the ceramic top coating may be through any application method or mechanism known in the art. In one, non-limiting implementation, the ceramic top coating is applied by plasma flame spraying the ceramic top coating on the gun barrel.

One or more implementations of manufacturing a gun barrel further comprise sealing the third coating of the fabricated gun barrel (step 30). According to some aspects, sealing the third coating of the fabricated gun barrel comprises seal coating the exterior of the third coating of the fabricated gun barrel with a liquid metal sealer. The liquid metal sealer may be of a phenolic base, such as those liquid metal sealers supplied by Metco (Metcoseal AP or BP) or Dictol Sealer. In other implementations, any liquid metal sealer known in the art may be utilized.

One or more implementations of manufacturing a gun barrel further comprise marking the fabricated gun barrel (step 20). Marking the gun barrel typically comprises marking the fabricated gun barrel with identifying marks that allow a user to identify at least one of the model and caliber of the inside barrel. Marking may further comprise marking the fabricated gun barrel with a brand identifying mark, such as Gunwright material. Marking may be done with a chemical, mechanical, laser, or any other marking mechanism known in the art.

Also contemplated as part of this disclosure are other methods of manufacturing or fabricating a new gun barrel. A new gun barrel may be manufactured or completely fabricated from powder metallurgy and metal spray techniques. In general, one or more methods of manufacturing a new gun barrel uses a material coating process that applies one or more coatings to a barrel comprising a gun barrel liner that copies the caliber diameter with rifling and SAAMI dimensions in reverse.

Figure 3:
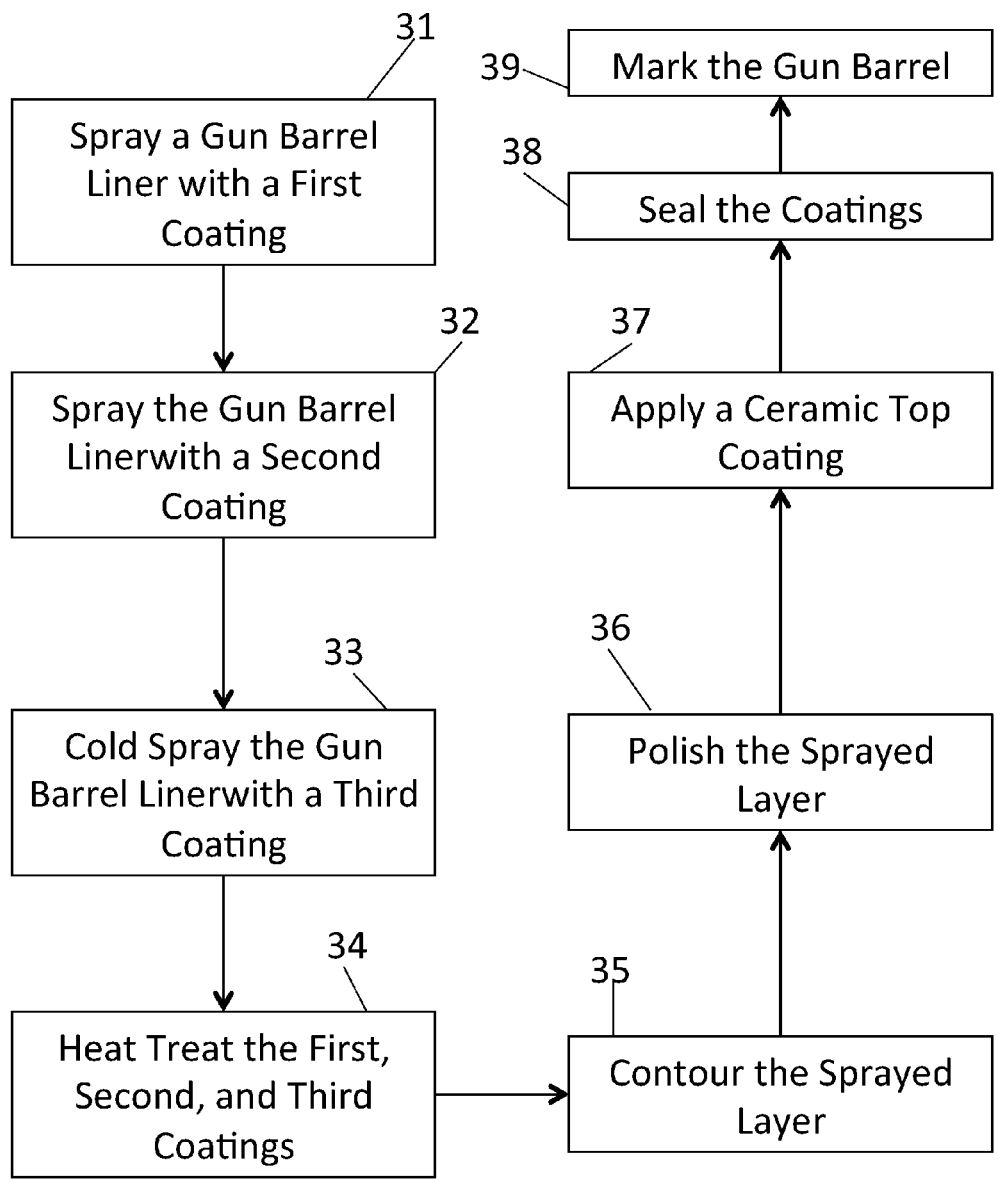
FIG. 3 is a flowchart of a third implementation of a method of manufacturing a gun barrel.

FIG. 3 depicts a non-limiting flowchart of one implementation of manufacturing or fabricating a new gun barrel. It is to be understood that various implementations may not include each of the steps shown in the flowchart of FIG. 3 and the order of the steps shown in FIG. 3 is not limiting. That is, in other implementations, the steps may be performed in an order different than that shown in FIG. 3 and step 31 may not be included without departing from the scope of this disclosure. The barrel may comprise any gun barrel liner known in the art and, according to some aspects, comprise rifling and/or SAAMI dimensions.

One or more implementations of a method of manufacturing a gun barrel comprise spraying a gun barrel liner with a first coating (step 31). Again, step 31 often is not included and the method usually begins with step 32. Spraying the gun barrel liner with a first coating typically comprises spraying the gun barrel liner with a hard, dense coating that includes at least one of tungsten carbide, chrome carbide, or ceramic. According to other aspects, the hard, dense coating of the first coating may comprise any compounds commonly known in the art. The first coating is typically sprayed on the gun barrel liner with a thermal spraying technique, such as but not limited to plasma spraying, HVOF, flame spraying, cold spraying, or any other technique for applying or depositing metal and/or ceramic coatings to the gun barrel liner to form an integral hard surface. According to one aspect, the first coating is approximately 0.010 inches thick after sprayed application to the gun barrel liner.

One or more implementations of a method of manufacturing a gun barrel further comprise spraying the gun barrel liner with a second coating (step 32). According to some implementations, spraying the gun barrel liner with a second coating comprises spraying the gun barrel liner with a second hard, dense coating after application of the first coating. In most implementations, however, the second coating may be sprayed directly on the gun barrel liner without including a first coating. The second coating is typically sprayed on the gun barrel liner with a thermal spraying technique, such as but not limited to plasma spraying, HVOF, flame spraying, cold spraying, or any other technique for applying or depositing metal and/or ceramic coatings to the gun barrel liner.

The second coating forms a metallurgical bond to the first coating and/or the gun barrel liner. The hard, dense coating of the second or bonding coating may comprise any compounds commonly known in the art. The bonding coating may comprise a material that work hardens. The bonding coating forms an integral strong base material that sustains pressures and fatigue values commonly associated with the combustion of powder and gasses from firing a life round and propelling the projectile (e.g. bullet) down the gun barrel to exit as a shot.

Some examples of materials are alloys and superalloys. An alloy is a mixture of metals or a mixture of a metal and another element. An alloy may be a solid solution of metal elements (a single phase) or a mixture of metallic phases (two or more solutions). Virtually any alloy may be employed. For the exemplary purposes of this disclosure, some alloys that are suitable for manufacturing methods disclosed here may be Alloys of aluminum, Alloys of chromium, Alloys of cobalt, Alloys of copper, Alloys of iron, Alloys of nickel, Alloys of titanium, and the like. Some alloys are nickel based, nickel-chromium based, cobalt based, zinc based, and the like. For example, a range copper-zinc alloys may be employed with differing combinations of properties, including strength, machinability, wear-resistance, hardness, color, thermal conductivity, and corrosion-resistance. A superalloy, or high-performance alloy, is an alloy that exhibits several key characteristics: excellent mechanical strength, resistance to thermal creep deformation, good surface stability and resistance to corrosion or oxidation (oxidation or corrosion resistance may be provided by elements such as aluminum and chromium for example). Some superalloys are nickel based, nickel-chromium based, cobalt based, and the like. Examples of superalloys are Hastelloy, Inconel (a family of austenite nickel-chromium-based superalloys), Waspaloy, Rene alloys, Haynes alloys, Incoloy, MP98T, TMS alloys, CMSX single crystal alloys, and the like.

Other materials may be metallic/ceramic materials, hafnium diboride, and the like. Even other materials may be any equivalents or combinations of any of the foregoing materials.

According to one aspect, the second coating is between approximately 0.050 inches and 0.100 inches thick after sprayed application to the gun barrel liner.

In one or more implementations, a method of manufacturing a gun barrel further comprises cold spraying the gun barrel liner with a third coating (step 33). More particularly, cold spraying the gun barrel liner may comprise cold gas-dynamic spraying the gun barrel liner after application of one or both of the first and second coatings with a third coating comprising a metal powder to form a metal layer. In one or more implementations, the metal powder comprises titanium powder, titanium alloy powder, aluminum powder, aluminum alloy powder, titanium-aluminum matrix powder, chromium powder, chromium alloy powder, cobalt powder, cobalt alloy powder, copper powder, copper alloy powder, iron powder, iron alloy powder, nickel powder, nickel alloy powder, and any combination thereof. Generally, the metal powder cold sprayed onto the gun barrel liner will be thick enough for a final machining of the fabricated gun barrel to a specified gun barrel contour. According to an aspect, the thickness of the first, second, and third coatings after spraying the gun barrel liner with the metal powder is between approximately 0.250 inches and 0.500 inches thick. More particularly, the thickness of the first, second, and third after spraying the gun barrel liner with the metal powder is between approximately 0.300 inches and 0.500 inches thick.

Similar to previous implementations, cold gas-dynamic spraying is highly advantageous to other methods of applying metals to a fabricated gun barrel. For example, cold gas-dynamic spraying a gun barrel liner with one or more of the listed metal powders fills and gives metallic strength to the fabricated gun barrel, resulting in a light-weight and relatively strong metal filler. Moreover, cold gas-dynamic spraying of the metal powder allows the metal powder to have metallurgical bond to the surface of the second coating as a solid state material with no heat affected zone, phase change, or oxide contamination. The added value of this material adds light-weight strength, reduces vibration, and controls heat for a more accurate shooting gun barrel.

One or more implementations of manufacturing a gun barrel further comprise heat treating at least one of the first, second, and third coatings (step 34). Heat treating at least one of the first, second, and third coatings typically comprises heat treating or annealing the respective coating(s) at applicable temperatures to normalize the material as applied. Heat treatment temperature ranges may be between approximately −300° C. and 1500° C. According to various aspects, heat treating of the one or more coatings may be performed after machining of the coatings or, alternatively, after an initial machining and before a final machining of the coatings.

One or more implementations of manufacturing a gun barrel further comprise contouring the sprayed layer of the sprayed coatings (step 35). Contouring the sprayed layer may comprise machining, grinding, or any other method of contouring otherwise known in the art. The sprayed layer typically comprises the third coating. In one or more implementations, the sprayed layer sprayed on the fabricated gun barrel is contoured to a specified barrel contour.

According to some aspects, a method for manufacturing a gun barrel comprises polishing the sprayed layer of the fabricated gun barrel (step 36). Polishing the sprayed is typically performed after the sprayed layer is contoured. Sand paper comprising between approximately 100 and 800 grit may be utilized to polish the fabricated gun barrel.

One or more implementations of a method for manufacturing a gun barrel comprise applying a ceramic top coating to the third coating of the fabricate gun barrel (step 37). According to some aspects, the ceramic top coating is applied to the third coating of the fabricated gun barrel after the metal powder has been sprayed on the gun barrel and before the gun barrel is sealed with a seal coating. More particularly, the ceramic top coating may be applied to the fabricated gun barrel after the sprayed layer is contoured and before the one or more coatings are sealed with a seal coating. The ceramic top coating typically adds aesthetic and mechanical properties, such as vibration and heat control, to the gun barrel.

The ceramic top coating may be applied to a desired thickness. In one or more implementations, the ceramic top coating is applied to a thickness of between approximately 0.015 inches and 0.030 inches. Application of the ceramic top coating may be through any application method or mechanism known in the art. In one, non-limiting implementation, the ceramic top coating is applied by plasma flame spraying the ceramic top coating on the fabricated gun barrel.

One or more implementations of manufacturing a gun barrel further comprise sealing the third coating of the fabricated gun barrel (step 38). According to some aspects, sealing the third coating of the fabricated gun barrel comprises seal coating the exterior of the third coating of the fabricated gun barrel with a liquid metal sealer. The liquid metal sealer may be of a phenolic base, such as those liquid metal sealers supplied by Metco (Metcoseal AP or BP) or Dictol Sealer. In other implementations, any liquid metal sealer known in the art may be utilized.

One or more implementations of manufacturing a gun barrel further comprise marking the fabricated gun barrel (step 39). Marking the gun barrel typically comprises marking the fabricated gun barrel with identifying marks that allow a user to identify at least one of the model and caliber of the inside barrel. Marking may further comprise marking the fabricated gun barrel with a brand identifying mark, such as Gunwright material. Marking may be done with a chemical, mechanical, laser, or any other marking mechanism known in the art.

Figure 4:
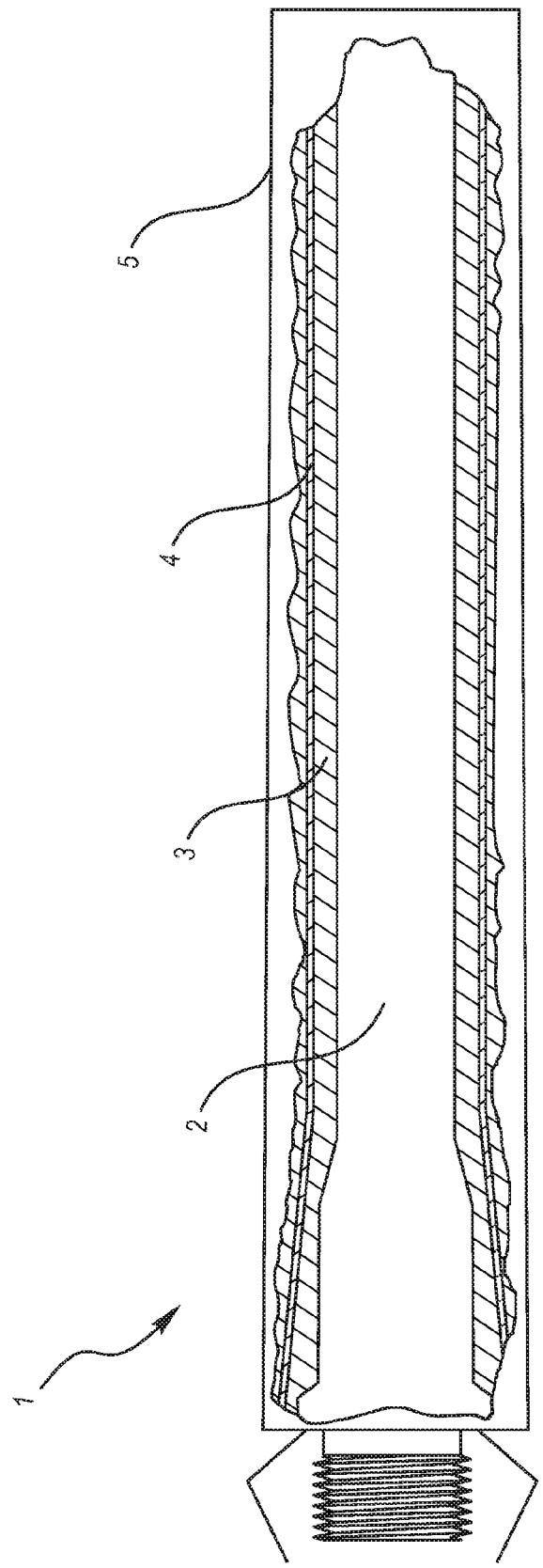
FIG. 4 is a view of gun barrel with a portion of the gun barrel removed to allow a cross sectional view of the gun barrel.

FIG. 4 depicts a view of a non-limiting manufactured gun barrel 1 formed according to one or more implementations of the methods disclosed herein, with a portion of the gun barrel 1 removed to allow a cross sectional view of the gun barrel 1. The gun barrel 1 depicted in FIG. 4 may comprise any gun barrel in the art without departing from the scope of this disclosure. But for exemplary purposes, in the non-limiting example shown in FIG. 4, the gun barrel 1 an original gun barrel 3 surrounding the bore 2 of the gun barrel. The manufactured gun barrel 1 further comprises a bonding coating 4 adjacent the original gun barrel 3. Adjacent the bonding coating 4 opposite the original gun barrel 3 is an outer layer 5. The bonding coating 4 and outer layer 5 may be formed of any of the materials described above in relation to one or more implementations associated with the flowchart of FIG. 1. Similarly, the thickness of the original gun barrel 3, the bonding coating 4, and the outer layer 5 may comprise any of the thicknesses described in other implementations presented herein.

Although gun barrels manufactured according to the various implementations described in relation to FIGS. 2 and 3 are not expressly shown, some gun barrels manufactured according to these implementations are similar to that shown in FIG. 4. For example, one or more gun barrels manufactured according to implementations of methods related to FIG. 2 comprise a mandrel shaped sized and shaped similar to the bore 2 depicted in FIG. 4 or the bore of any gun barrel known in the art. Furthermore, one or more gun barrels manufactured according implementations of methods related to FIG. 2 may comprise a first coating positioned similar to the original gun barrel 3, a second coating positioned similar to the bonding coating 4, and a third coating positioned similar to the outer layer 5 of FIG. 4. Dimensions of these coatings are according to those described in relation to FIG. 2.

Similarly, one or more gun barrels manufactured according to implementations of methods related to FIG. 3 comprise a gun barrel liner sized and shaped similar to the bore 2 depicted in FIG. 4 or the bore of any gun barrel known in the art. Furthermore, one or more gun barrels manufactured according to implementations of methods related to FIG. 3 may comprise a first coating positioned similar to the original gun barrel 3, a second coating positioned similar to the bonding coating 4, and a third coating positioned similar the outer layer 5 of FIG. 4. Dimensions of these coatings are according to those described in relation to FIG. 3.

Figure 5:
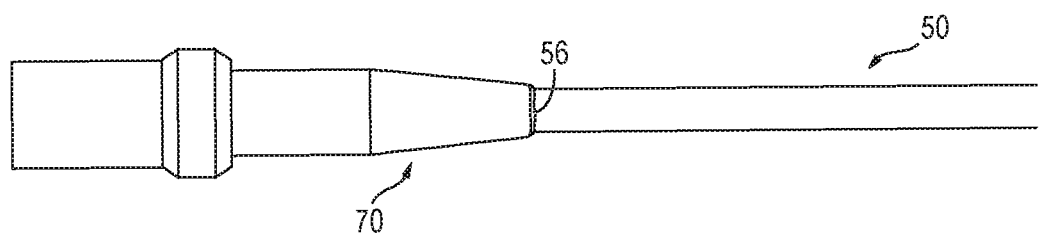
FIG. 5 is a side view of a gun barrel liner coupled to a gun chamber.
Figure 6:
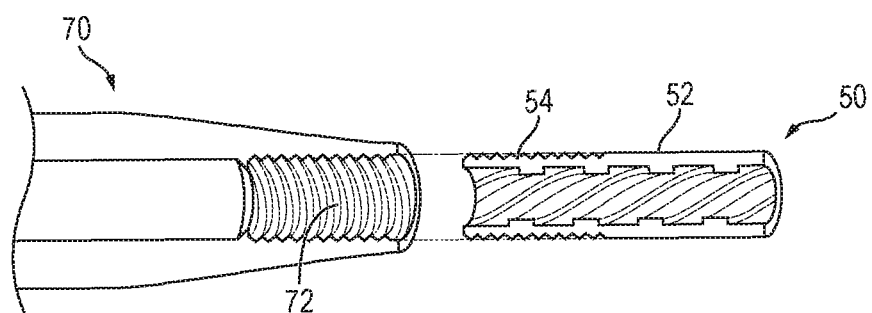
FIG. 6 is a side view of a gun barrel liner and a gun chamber before coupling.
Figure 7:
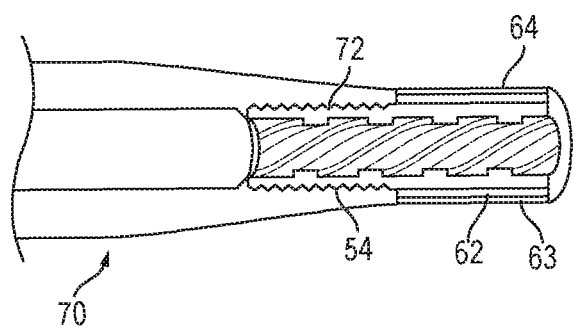
FIG. 7 is a cross-sectional side view of a gun barrel liner coupled to a gun chamber with one or more coatings applied to the gun barrel liner.

Also contemplated in this disclosure are various systems and methods for manufacturing a gun barrel utilizing a barrel that comprises a gun barrel liner 50. FIGS. 5-7 depict various views of stages during still another non-limiting implementation of systems and methods for manufacturing or fabricating a gun barrel. FIG. 6, for example, depicts a cross section view of a gun barrel liner 50 separated from a gun chamber 70 before coupling. FIG. 5 shows a side view of a gun barrel liner 50 coupled to a gun chamber 70 with coupling material 56 (described in greater detail below) before additional layers have been applied to the gun barrel liner 50. FIG. 7 is a cross sectional view of FIG. 5, with the additional of one or more coatings that shall be described in greater detail below or elsewhere in this document. It is to be understood that various implementations may not include each of the steps described below and shown in the FIGS. 5-7 and the order of the steps described is not limiting. That is, in other implementations, the steps may be performed in an order different than that described and shown or applying a bond coating for example may not be included (just applying a top coating) without departing from the scope of this disclosure.

In some non-limiting implementations, a method of manufacturing a gun barrel, comprises threading an outer surface 52 of a gun barrel liner 50 proximate a first end 51 of the gun barrel liner 50 to form male threading 54. A method may further comprise threadedly coupling the first end 51 of the gun barrel liner 51 to a gun chamber 70. A method may still further comprise fixedly coupling the gun barrel liner 50 to the gun chamber 70 with coupling material 56. Finally, a method of manufacturing a gun barrel may comprise applying one or more coatings to the gun barrel liner 50.

According to some aspects and prior to applying one or more coatings, a method of forming a gun barrel may further comprise threading an inner surface 71 of the gun chamber 70 to form female threading 72 complementary to the threading 54 of the gun barrel liner 50. Fixedly coupling the gun barrel liner 50 to the gun chamber 70 with coupling material 56 may comprise at least one of tack welding, soldering, or brazing the gun barrel liner and the gun chamber.

According to some aspects, applying one or more coatings to the gun barrel liner 50 may comprise spraying the outer surface 52 of gun barrel liner 50 with a bond coating 62. The bond coating 62 may comprise a nickel based alloy or superalloy or any of the other applicable bond coating materials described previously in this document. Spraying the gun barrel liner 50 with coating 62 may comprise thermally spraying (e.g. plasma spraying or high velocity oxygen fuel spraying) the gun barrel liner 50 with the coating 62 until the coating 62 is between approximately 0.050 inches and 0.100 inches thick.

Applying one or more coatings to the gun barrel liner 50 may further comprise in addition to applying coating 62 or instead of coating 62 cold gas-dynamic spraying the gun barrel liner 50 with a top coating 63. The top coating 63 may comprise at least one of titanium powder, titanium alloy powder, aluminum powder, aluminum alloy powder, titanium-aluminum matrix powder, chromium powder, chromium alloy powder, cobalt powder, cobalt alloy powder, copper powder, copper alloy powder, iron powder, iron alloy powder, nickel powder, nickel alloy powder, and any combination thereof. Cold gas-dynamic spraying the gun barrel liner 50 with the coating 63 may comprise cold gas-dynamic spraying the gun barrel liner 50 with the coating 63 until it is (or the coatings 62 and 63 together if coating 62 is included) is/are between approximately 0.300 inches and 0.500 inches thick.

Various methods may comprise heat treating coatings 62 and 63 or coating 63, spraying coating 63 with a ceramic coating before sealing coating 63 with the liquid metal sealer 64, contouring coating 63, sealing coating 63 with a liquid metal sealer 64, and/or polishing at least one of coating 62 and coating 63.

As explained previously, heat treating coatings typically comprises heat treating or annealing the respective coating(s) at applicable temperatures to normalize the material as applied. Heat treatment temperature ranges may be between approximately −300° C. and 1500° C. According to various aspects, heat treating of the one or more coatings may be performed after machining of the coatings or, alternatively, after an initial machining and before a final machining of the coatings.

Contouring an applied or sprayed layer may comprise machining, grinding, or any other method of contouring otherwise known in the art. In one or more implementations, the layer on the fabricated gun barrel is contoured to a specified barrel contour.

Polishing a layer is typically performed after the layer is contoured. Sand paper comprising between approximately 100 and 800 grit may be utilized to polish the fabricated gun barrel.

According to some aspects, a ceramic top coating may be applied to an outer coating of the fabricated gun barrel before the gun barrel is sealed with a seal coating. The ceramic top coating typically adds aesthetic and mechanical properties, such as vibration and heat control, to the gun barrel. The ceramic top coating may be applied to a desired thickness. In one or more implementations, the ceramic top coating is applied to a thickness of between approximately 0.015 inches and 0.030 inches. Application of the ceramic top coating may be through any application method or mechanism known in the art. In one, non-limiting implementation, the ceramic top coating is applied by plasma flame spraying the ceramic top coating on the fabricated gun barrel.

According to some aspects, sealing the fabricated gun barrel comprises seal coating the exterior of the outer coating of the fabricated gun barrel with a liquid metal sealer. The liquid metal sealer may be of a phenolic base, such as those liquid metal sealers supplied by Metco (Metcoseal AP or BP) or Dictol Sealer. In other implementations, any liquid metal sealer known in the art may be utilized.

In general, any references to spraying in this document may comprise thermal spraying techniques and be employed to apply at least one coat. In one or more implementations, a single coat may comprise a bond coat or a top coat, such as a metallic coating or other applicable coating. If two coats are applied to some implementations, the coats may comprise a bond coat and a top coat (such as a ceramic coating or other applicable coating). The top and bond coats may be distinct and separate. Alternatively, they may comprise a graduated coat which transitions from only a bond coat to an integrated bond/top coat (e.g., metal with alloy, metal with metal, metal with ceramic, and the like) to only a top coat.

It is further noted that any of the sprayed coatings may be comprised of metal, ceramic, alloys, superalloys, and combinations of thereof. Plastics and polymer materials may also be included as all or part of any of the coatings described herein. These coatings will enhance the firearms and their parts for accuracy, longevity, accuracy and grip.

Thermal spray is used in its broadest sense and, for the exemplary purposes of this disclosure, may include Plasma Flame Spray, Twin Wire Arc Spray, Combustion Powder or Wire Spray, Low Pressure Cold Spray, High Pressure Cold Spray, Low Pressure or Vacuum Plasma Spray would be used. Other coatings that may be used are CVD (Chemical Vapor Deposition), PVD (Physical Vapor Deposition), Thin film coating processes, Sputtering, and the like.

Specifically and for the exemplary purposes of this disclosure, barrels may be simply prepared and sprayed to a thickness of about 0.015-0.030" for example for a coating barrel enhancement. Alternatively, the barrel may be a midweight or lightweight barrel, or if it is a heavier barrel, pre-machined to remove major material (about 0.100-0.250" for example), and then a very thick coating of about 0.100-0.250" for example may be applied. Pre-machining and "thin walling" the barrel, or any other suitable firearm part for that matter, allows the coating thickness to maintain its maximum benefit or purpose. This in turn allows a lighter component with greater strength and accuracy potential than normal manufacturing techniques. Pre-machining and "thin walling" include but are not be limited to machining, grinding, EDM, hand finishing, and/or the like before and/or after spray coating is applied.

From a preparation standpoint, firearm barrels may have holes, scratches, wording, or other defects or issues that need to be repaired, filled, covered up, and the like before applying the coat. This may be accomplished by spraying a coat (using a Cold Spray process for example) over the particular area at issue.

It will be understood that implementations are not limited to the specific components and steps disclosed herein, as virtually any components and steps consistent with the intended gun barrel manufacturing implementation may be utilized. Accordingly, for example, although particular components, steps, and so forth, are disclosed, such steps may employ components of any shape, size, style, type, model, version, class, grade, measurement, concentration, material, weight, quantity, and/or the like consistent with the intended operation of a gun barrel manufacturing implementation. Implementations are not limited to uses of any specific components, provided that the components selected are consistent with the intended gun barrel manufacturing implementation.

Various gun barrel implementations may be manufactured using conventional procedures as added to and improved upon through the procedures described here. It will also be understood that the fabricating of gun barrel implementations are not limited to the specific order of steps as disclosed in this document. Any steps or sequence of steps of the fabricating of gun barrel implementations indicated herein are given as examples of possible steps or sequence of steps and not as limitations, since various fabricating processes and sequences of steps may be used to fabricate gun barrel implementations.

Implementations of the disclosures presented herein are particularly useful in enhancing and improving weapon accuracy, handling, and appearance. Implementations may also be used in a variety of applications with similar results, such as military, shooting sports competition, hunting, and personal firearm applications. However, implementations are not limited to these uses. Implementations of the foregoing and other aspects and implementations may have one or more or all of the following advantages. They will enhance the performance of firearms. Barrels will have temperature control, harmonic balance, and corrosion protection. In addition, barrels will be or have one or more or all of the following: a pleasing aesthetic appearance; dull, low shine light reflection; reduced weight; harder and more durable and scratch resistant; and/or longer lasting.

Also contemplated as part of this disclosure is spray coating of firearm parts and component in addition to the barrel. For example, a trigger spray may by applied to the finger face about a 0.015-0.030" thick coat to add "grip control" for a non-slip surface for good to extreme conditions. A sear spray may be applied on the engagement surface to add longevity, positive disengagement, and a hard, lasting, lubrication coating for maximum release control. For example, a tungsten carbide coat may be applied which provides a harder wear surface than the original metal and which may be polished and can retain its polished state longer than the original metal. A bushing spray may be applied not only to the barrel using a metallic/ceramic material, but also machining about 0.010 inch off the barrel seat face and applying aluminum via a cold spray process for example. Aluminum has different properties than steel and is used as a vibration dampening material interfacing with the action. In this manner a metallurgical bonded aluminum bushing may be formed between the barrel and action. The metallurgical bonded aluminum bushing may be machined to meet "head space" dimensions for the caliber used. A preparation spray may be applied to firearm parts having holes, scratches, wording, or other defects or issues that need to be repaired, filled, covered up, and the like before applying the coat. This may be accomplished by spraying a coat (using a cold spray process for example) over the particular area at issue.

In places where the description above refers to particular implementations, it should be readily apparent that a number of modifications may be made without departing from the spirit thereof and that these implementations may be applied to other applications. The presently disclosed implementations are, therefore, to be considered in all respects as illustrative and not restrictive.

It will also be understood that implementations are not limited to the specific components disclosed herein, as virtually any components consistent with the intended operation of a method and/or system implementation for gun barrel manufacturing may be utilized. Accordingly, for example, although particular gun barrels, gun barrel liners, and other components may be disclosed, such components may comprise any shape, size, style, type, model, version, class, grade, measurement, concentration, material, weight, quantity, and/or the like consistent with the intended operation of a method and/or system implementation for a gun barrel may be used.

In places where the description above refers to particular implementations of gun barrel manufacturing, it should be readily apparent that a number of modifications may be made without departing from the spirit thereof and that these implementations may be applied to other methods of manufacturing a gun barrel. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A method of manufacturing a gun barrel comprising: applying a bond coating comprising an alloy or superalloy to an outer surface of a gun barrel; and cold gas-dynamic spraying the gun barrel with a top coating comprising at least one of titanium powder, titanium alloy powder, aluminum powder, aluminum alloy powder, titanium-aluminum matrix powder, chromium alloy powder, cobalt powder, cobalt alloy powder, copper powder, copper alloy powder, iron powder, iron alloy powder, nickel powder, nickel alloy powder, and any combination thereof.

2. The method of claim 1, wherein applying the bond coating comprises applying a bond coating comprising a nickel based alloy or superalloy to the gun barrel.

3. The method of claim 1, wherein applying the bond coating comprises spraying the gun barrel with a bond coating comprising a nickel based alloy or superalloy.

4. The method of claim 3, wherein spraying the gun barrel comprises thermal spraying the gun barrel with a bond coating comprising a nickel based alloy or superalloy until the bond coating is between approximately 0.005 inches and 0.010 inches thick.

5. The method of claim 3, wherein cold gas-dynamic spraying the gun barrel comprises cold gas-dynamic spraying the gun barrel with the top coating until the bond and top coatings together are between approximately 0.300 inches and 0.500 inches thick.

6. The method of claim 1, further comprising:
threading an outer surface of the gun barrel proximate a first end of the gun barrel;
threadedly coupling the first end of the gun barrel to a gun chamber; and
fixedly coupling the gun barrel to the gun chamber before applying the bond coating.

7. The method of claim 6, further comprising threading an inner surface of the gun chamber complementary to the threaded outer surface of the gun barrel.

8. The method of claim 6, wherein fixedly coupling the gun barrel to the gun chamber comprises at least one of tack welding, soldering, or brazing the gun barrel and the gun chamber.

9. The method of claim 1, wherein applying a bond coating comprises thermal spraying the gun barrel with a bond coating comprising a nickel based alloy or superalloy until the bond coating is between approximately 0.005 inches and 0.010 inches thick.

10. The method of claim 1, wherein cold gas-dynamic spraying the gun barrel comprises cold gas-dynamic spraying the gun barrel with the top coating until the bond and top coatings together are between approximately 0.300 inches and 0.500 inches thick.

11. The method of claim 1, further comprising heat treating the bond and top coatings.

12. A method of manufacturing a gun barrel comprising: cold gas-dynamic spraying an outer surface of a gun barrel with a top coating comprising at least one of titanium powder, titanium alloy powder, aluminum powder, aluminum alloy powder, titanium-aluminum matrix powder, chromium alloy powder, cobalt powder, cobalt alloy powder, copper powder, copper alloy powder, iron powder, iron alloy powder, nickel powder, nickel alloy powder, and any combination thereof.

13. The method of claim 12, further comprising:
threading an outer surface of the gun barrel proximate a first end of the gun barrel;
threadedly coupling the first end of the gun barrel to a gun chamber; and
fixedly coupling the gun barrel to the gun chamber before applying the top coating.

14. The method of claim 13, further comprising threading an inner surface of the gun chamber complementary to the threaded outer surface of the gun barrel.

15. The method of claim 13, wherein fixedly coupling the gun barrel to the gun chamber comprises at least one of tack welding, soldering, or brazing the gun barrel and the gun chamber.

16. The method of claim 12, wherein cold gas-dynamic spraying the gun barrel comprises cold gas-dynamic spraying the gun barrel with the top coating until the top coating is between approximately 0.300 inches and 0.500 inches thick.

* * * * *